United States Patent [19]

Kato

[11] Patent Number: 4,688,082
[45] Date of Patent: Aug. 18, 1987

[54] MULTI-SYSTEM TELEVISION RECEIVER
[75] Inventor: Tomio Kato, Utsunomiya, Japan
[73] Assignee: Sharp Kabushiki Kaisha, Osaka, Japan
[21] Appl. No.: 735,048
[22] Filed: May 16, 1985
[30] Foreign Application Priority Data May 23, 1984 [JP] Japan .............................. 59-75991[U]
May 30, 1984 [JP] Japan ............................. 59-81275[U]
Nov. 13, 1984 [JP] Japan ............................ 59-171993[U]

[51] Int. Cl.⁴ .............................................. H04N 5/46
[52] U.S. Cl. ................................... 358/21 R; 358/23; 358/38
[58] Field of Search ................... 358/21 R, 23, 26, 38, 358/150, 158

[56] References Cited
U.S. PATENT DOCUMENTS 3,795,762  3/1974  Willis ................................ 358/21 R
4,253,116  2/1981  Rodgers, III ....................... 358/158
4,309,719  1/1982  Hinn .................................. 358/21 R
4,414,563  11/1983 Juhnke .............................. 358/21 R Primary Examiner—Michael A. Masinick
Attorney, Agent, or Firm—Birch, Stewart, Kolasch & Birch

[57] ABSTRACT

A multi-system television receiver capable of receiving television signals of PAL system, NTSC system and SECAM system with a plurality of different subcarrier wave frequencies, includes a frequency detecting circuit for detecting the frequency of a subcarrier wave of the television signal and producing frequency data representing the detected frequency, a system detecting circuit for detecting the system of the television signal and producing system data representing the detected system, a channel change detecting circuit for detecting a channel change, a holding circuit for holding the frequency data and the system data upon changing of the channel detected by the detecting circuit, and television circuits which are set in a condition in compliance with the broadcast system of the received television signal as determined by the frequency data and the system data.

5 Claims, 5 Drawing Figures

MULTI-SYSTEM TELEVISION RECEIVER

BACKGROUND OF THE INVENTION

1. Field of the Invention

The present invention relates to a multi-system television receiver having a subcarrier generation circuit which is operable on a number of different systems.

2. Description of the Prior Art

In the world, there are a number of different types of television broadcasting systems, such as, PAL system, SECAM system, NTSC system and others. In some places in the world, television broadcasting with two or more systems is available. Also, video tapes recorded under different systems are available.

To enable the reproduction of color television signals of different systems, a color television receiver which can receive and reproduce color television signals of different systems has been developed. Such a television receiver is referred to as a multi-system television receiver.

The signal format for the NTSC system and that for the PAL system are very similar to each other. Therefore, in the prior art multi-system television receiver, the color signal processing circuit, particularly the subcarrier wave oscillator, an APC phase detector and a killer phase detector are used in common for both systems. Furthermore, the multi-system television receiver has a detecting means for detecting the type of television system being received so as to switch various circuits which are necessary to process the television signal to a viewable image on a CRT.

For example, according to the PAL system, a subcarrier wave having a frequency of 4.43 MHz is used in most places, but in some places, a 3.58 MHz subcarrier wave is used. As to the NTSC system a, 3.58 MHz subcarrier wave is used normally. Furthermore, some VRT tapes recorded under NTSC system use 3.58 MHz and others use 4.43 MHz subcarrier wave.

Accordingly, the prior art multi-system television receiver which can receive television signals in PAL system and NTSC system, or which can reproduce VTR tapes recorded under various systems, employs two oscillators for generating two subcarrier waves having frequencies of 4.43 MHz and 3.58 MHz. For this purpose, a suitable switching means is provided for selecting one oscillator for generating the required subcarrier waves.

Therefore, the prior art multi-system television receiver requires two oscillators, resulting in high manufacturing cost. Also, a suitable switching means is necessary to select one oscillator for the particular system signal being received.

To remove the above described disadvantage, a multi-system television receiver having an improved subcarrier generation circuit has been proposed by the same inventor as the present invention, and is disclosed in Japanese Patent Application laid-open publication No. 58-152070, which is assigned to the same assignee as the present application. According to this publication, only one oscillator is provided which may generate subcarrier waves at different frequencies, and automatically selects and produces a subcarrier wave having an appropriate frequency for the received television signal. A detail of the subcarrier generation circuit disclosed in this publication will be described below in connection with FIG. 1.

In FIG. 1, reference number 1 designates a burst gate circuit which, in accordance with the burst gate pulse in the horizontal scanning period, separates and generates a burst gate signal from the chrominance signal. Reference number 2 is a phase detector for the automatic phase controller (APC), 3 is a low pass filter, and 4 is a voltage-controlled oscillator (VCO). These circuits 2, 3 and 4 define an automatic phase controller (APC), and thus VCO 4 produces a subcarrier signal.

VCO 4 is provided with two crystal vibrators 5a and 5b for generating a signal at a frequency 3.58 MHz or 4.43 MHz. A switching circuit 6 is provided for selectively connecting one crystal vibrator to VCO 4 in response to the frequency of the burst signal.

Further provided is a phase detector 7 for a killer. When phase detector 7 stops producing the normal signal, flip-flop 8 reverses its condition upon receipt of a driving pulse having a pulse width of about 200 milliseconds. The output of flip-flop 8 is connected to switching circuit 6 for selecting one vibrator.

The operation of the subcarrier generation circuit of FIG. 1 is as follows. When a television signal of the NTSC system is received, a burst signal having a frequency 3.58 MHz is separated and produced from burst gate circuit 1. The burst signal is applied to both phase detectors 2 and 7. In this case, switching circuit 6 is so actuated as to connect crystal vibrator 5a with VCO 4 in accordance with the output signal from flip-flop 8, and at the same time, the APC loop operates in a synchronized relationship with the burst signal at a frequency 3.58 MHz. Thus, VCO 4 produces a subcarrier wave having a frequency 3.58 MHz. In this manner, once the APC loop is synchronized, phase detector 7 produces a phase detected signal which suspends the further operation of flip-flop 8. Thus, VCO 4 produces the normal 3.58 MHz subcarrier wave in a stable condition. Then, if for some reason, the control of flip-flop 8 delays, switching circuit 6 may be so operated as to connect crystal vibrator 5b (4.43 MHz) to VCO 4. In such a case, the signal in the APC loop becomes missynchronized, thereby no output signal is produced from phase detector 7. Thus, flip-flop 8 changes its condition upon receipt of a next drive pulse, thereby switching the switching circuit 6 to connect crystal vibrator 5a (3.58 MHz) to VCO 4. Accordingly, the APC loop is synchronized at a frequency of 3.58 MHz, so that VCO 4 produces a normal subcarrier wave at frequency 3.58 MHz.

Next, when a television signal of the PAL system is received upon changing the channel, a burst signal having a frequency 4.43 MHz is separated and produced from burst gate circuit 1. Accordingly, by the output signal from flip-flop 8, switching circuit 6 is actuated to connect crystal vibrator 5b to VCO 4. Thus, APC loop operates in a synchronized relationship with the burst signal at a frequency 4.43 MHz. Thus, VCO 4 produces a subcarrier wave having a frequency 4.43 MHz. In this manner, once the APC loop is synchronized at frequency 4.43 MHz, phase detector 7 produces a phase detected signal which suspends the further operation of flip-flop 8. Thus, VCO 4 produces the normal 4.43 MHz subcarrier wave in a stable condition.

According to the prior art subcarrier generation circuit described above, there are a number of disadvantages as described below.

The first disadvantage is about an error operation which may take place when a television signal of the SECAM system is received.

According to the SECAM system, chrominance signal contains a subcarrier wave at a frequency 4.25 MHz or 4.406 MHz, which is very close to the frequency 4.43 MHz of the burst signal. Accordingly, if the signal component at the trailing edge of the horizontal sync signal where the burst signal of PAL system or NTSC system is located should come in while the television signal of the SECAM system is being received, the APC circuit makes a retraction operation, resulting in an error operation as if the burst signal at 4.43 MHz is received.

The second disadvantages is about an error operation which may take place upon change of the channel from a channel in one broadcasting system, such as a PAL system, to a channel in another broadcasting system, such as a SECAM system.

More specifically, according to the prior art subcarrier generation circuit, the low pass filter defining the APC loop has a relatively long time constant. Therefore, when the channel change between two different broadcasting systems is effected, it takes a relatively long time to detect the broadcasting system of the newly selected channel and to switch the switching circuit 6 so as to generate a proper subcarrier wave from VCO 4. During this period of time, the image on the screen is often distorted.

The last disadvantage is about an error operation caused by a noise signal produced from flip-flop circuit 8 or a system detection circuit for detecting the type of broadcasting system now receiving.

Specifically, according to the prior art multi-system television receiver, the system detection circuit detects and produces a signal representing the type of broadcasting system being received. However, the system detection circuit makes an error detection by the noise signal. The noise signal is, for example, contained in the received broadcasting signal, or produced upon reproduction of a tape recorded under poor conditions, or produced when the video search signal is added.

SUMMARY OF THE INVENTION

The present invention has been developed with a view to substantially solving the above described disadvantages and has for its essential object to provide an improved multi-system television receiver which will not make any error operation by noise signals caused by the change of the channel between two different broadcasting systems or by any other reasons described above.

It is also an essential object of the present invention to provide an improved multi-system television receiver which can immediately provide a stable image after the change of the channel particularly between two different broadcasting systems.

In accomplishing these and other objects, a multi-system television receiver, according to the present invention, is capable of receiving television signals of different systems, such as PAL system, NTSC system and SECAM system with a plurality of different subcarrier wave frequencies, and which comprises a frequency detecting circuit for detecting the frequency of a subcarrier wave of the television signal and producing frequency data representing the detected frequency, a system detecting circuit for detecting the system of the television signal and producing system data representing the detected system, channel change detecting circuit for detecting a channel change, holding circuit for holding the frequency data and the system data upon change of the channel detected by the detecting circuit, and television circuits which are set in a condition in compliance with the broadcast system of the received TV signal as determined by the frequency data and the system data.

Furthermore, according to a preferred embodiment of the present invention, a multi-system television receiver comprises an APC loop including a voltage-controlled oscillator and vibrating elements coupled to the oscillator for the oscillation at different frequencies, a phase detector for detecting a phase difference between a burst signal of the television signal and oscillating signal from the oscillator, a flip-flop which is controlled by a signal produced from the phase detector, a circuit for generating a color killer signal for the SECAM system, and a switching circuit controlled by the flip-flop and the circuit for selecting one vibrating element for effecting the oscillation at a required frequency.

Further provided in the preferred embodiment described above is a pulse generating circuit which generates a channel change pulse upon change of the channel, and wherein the APC loop further comprises a low pass filter connected to the voltage controlled oscillator. The low pass filter has a time constant setting circuit for making the time constant of the low pass filter short when the channel change pulse is present.

Also, in the preferred embodiment described above, the phase detector also has a time constant setting circuit for making the time constant of the phase detector short when the channel change pulse is present.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
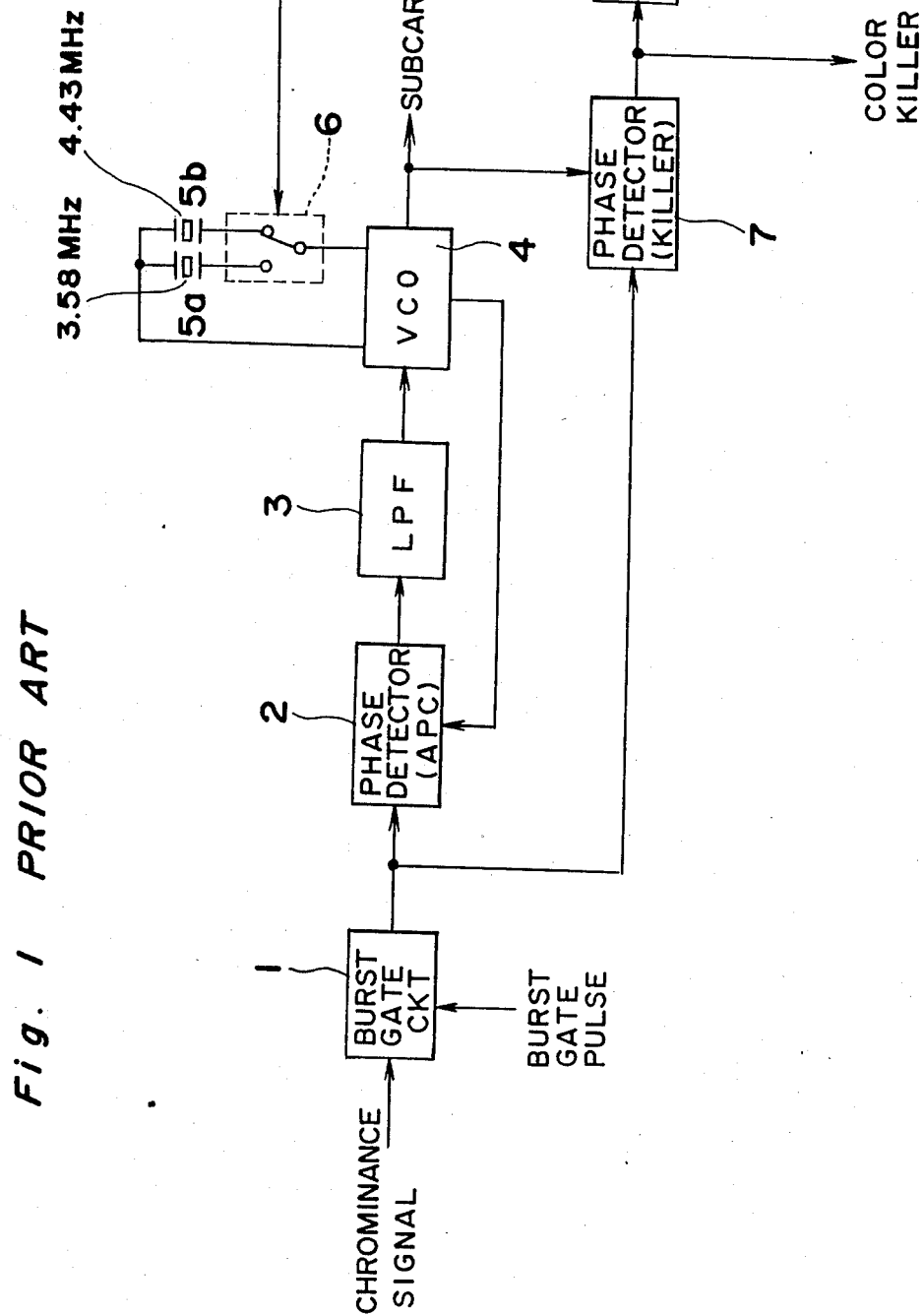
FIG. 1 is a circuit diagram showing a subcarrier generation circuit according to the prior art.
Figure 2:
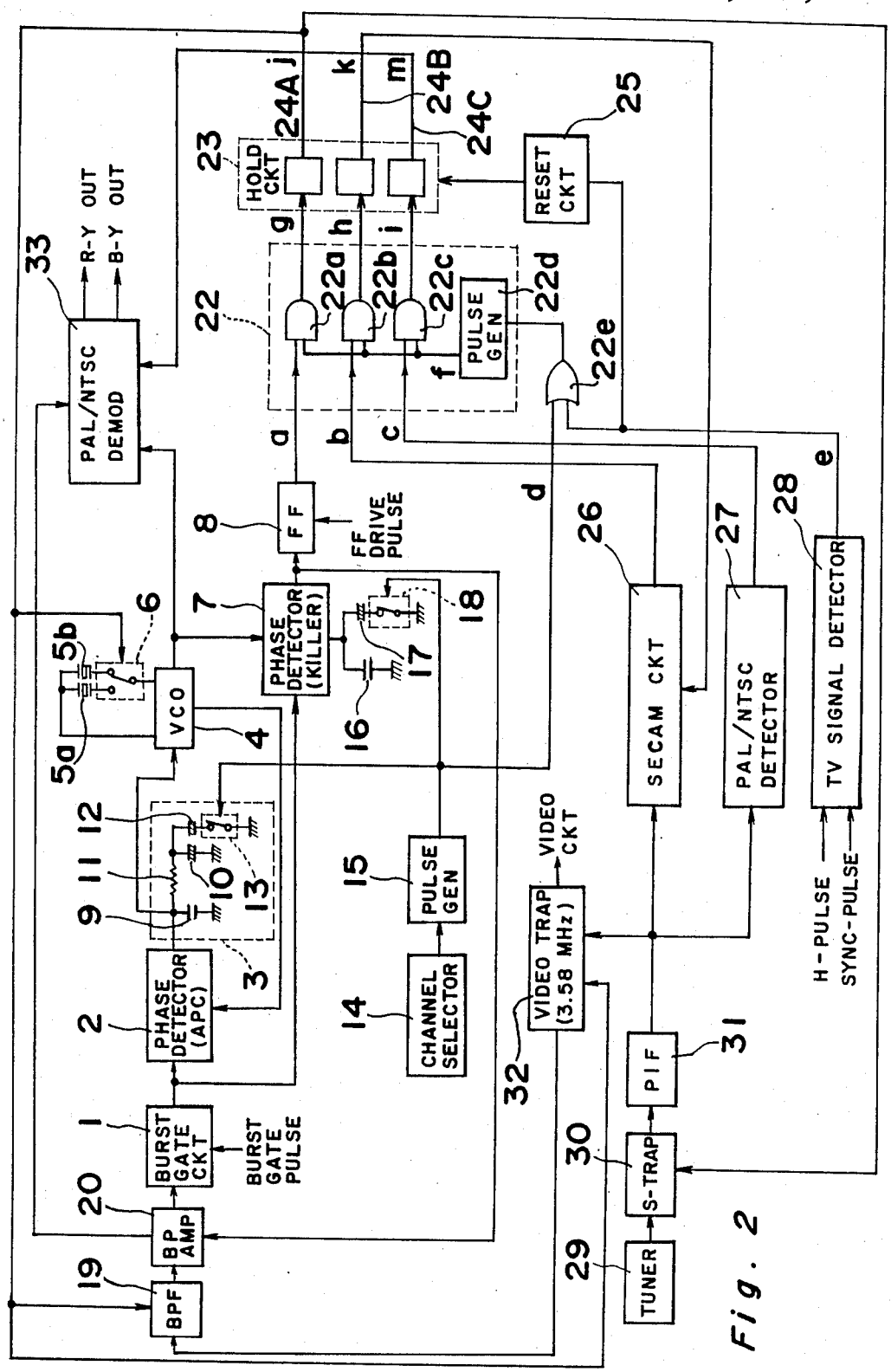
FIG. 2 is a circuit diagram showing a subcarrier generation circuit and its associated parts, according to the preferred embodiment of the present invention.

Referring to FIG. 2, a tuner 29 for receiving television signals and producing a tuned television signal is connected to a sound-trap 30 and further to a picture intermediate frequency (PIF) 31. The output of PIF 31 is connected to each of a SECAM circuit 26, a PAL/NTSC detector 27 and a video trap 32. Video trap 32, which is also coupled to a video circuit (not shown), is connected to a band pass filter (BPF) 19 and further to a band pass amplifier 20. Accordingly, band pass amplifier 20 produces a chrominance signal which is applied to a burst gate circuit 1. Burst gate circuit 1 operates in response to a burst gate pulse. The output of burst gate circuit 1 is connected to a phase detector 2 for use in an automatic phase controller (APC). A low pass filter 3 is connected to phase detector 2 and further to a voltage-controlled oscillator 4 which is coupled via switching circuit 6 to crystal vibrators 5a and 5b for the oscillation at different frequencies 3.58 MHz and 4.43 MHz, respectively. An automatic phase controller (APC) is defined by a feed back loop containing phase detector 2, low pass filter 3 and VCO 4. Accordingly, VCO 4 produces a subcarrier signal at a frequency 3.58 MHz or 4.43 MHz depending on the frequency of the burst signal, in a manner which will be described in detail later.

According to the preferred embodiment, low pass filter 3 comprises a capacitor 9 connected between a hot line, through which the signal transmits, and ground. Also, a series connection of a resistor 11 and a capacitor 10 is connected parallel to capacitor 9. Furthermore, a series connection of a capacitor 12 and a normally-closed switch 13 is connected parallel to capacitor 10. Normally-closed switch 13 is controlled by a pulse from a pulse generator 15 in a manner which will be described later.

The output of VCO 4 is applied to a PAL/NTSC demodulator 33 which produces R-Y signal or B-Y signal. The output of VCO 4 is also applied to a phase detector 7, which also receives the output signal from burst gate circuit 1.

According to a preferred embodiment, phase detector 7 is connected with a capacitor 16 which is grounded. Also, a series connection of capacitor 17 and a normally-closed switch 18 is connected parallel to capacitor 16. Normally-closed switch 18 is also controlled by a pulse from pulse generator 15 in a manner described below.

A channel selector 14 is coupled to a pulse generator 15. Whenever the broadcasting channel is changed by channel selector 14, pulse generator 15 generates a short pulse, such as shown by waveform d in FIG. 3. The short pulse is applied to each of normally-closed switches 13 and 18 so as to open them temporarily during the pulse duration. When switch 13 opens, capacitor 12 is disconnected from capacitor 10, thereby making the time constant of low pass filter 3 short. Similarly, when switch 18 opens, time constant of phase detector 7 is shortened. When the time constant is shortened, the retraction operation of the APC loop occurs faster, whereby the subcarrier wave for the newly selected channel may be produced very fast from the VCO. This quick response can be accomplished even when the channel change is effected between two different broadcasting systems having different subcarrier wave frequencies. Accordingly, a stable subcarrier wave can be obtained immediately after the change of the channel.

Figure 3:
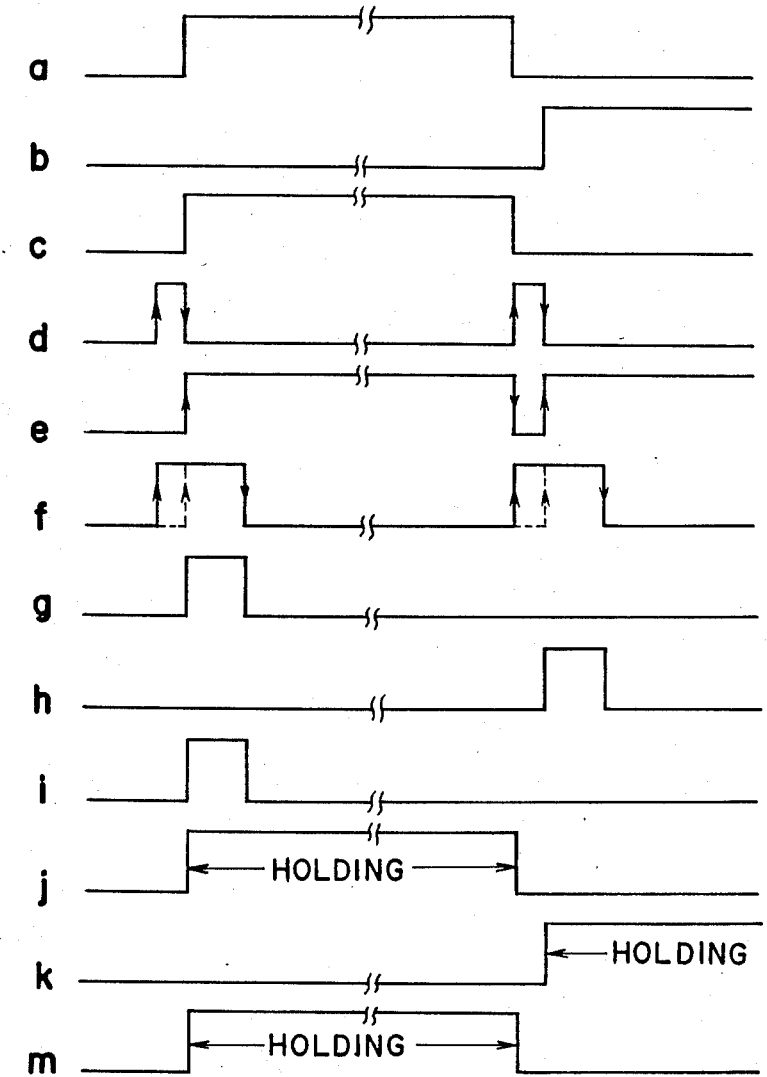
FIG. 3 is a graph showing waveforms obtained at various places in the circuit of FIG. 2.

Phase detector 7 is provided to produce a color killer output, which is applied to both band pass amplifier 20 and flip-flop circuit 8. When VCO 4 is producing a subcarrier signal having a frequency 3.58 MHz, flip-flop 8 generates HIGH in response to the signal produced from phase detector 7. Similarly, when VCO 4 is producing a subcarrier signal having a frequency 4.43 MHz, flip-flop 8 generates LOW. The output of flip-flop 8, such as shown in FIG. 3 at waveform a, is applied to AND gate 22a provided in a detection control circuit 22.

Detection control circuit 22 further includes AND gates 22b and 22c and a pulse generator 22d. One input of AND gate 22b is connected to SECAM circuit 26 which produces HIGH when the received television signal is the SECAM system, and LOW when it is not, such as indicated in FIG. 3, waveform b. One input of AND gate 22c is connected to PAL/NTSC detector 27 which produces HIGH when the received television signal is NTSC system and LOW when it is either PAL system or SECAM system, such as indicated in FIG. 3, waveform c. The other inputs of AND gates 22a, 22b and 22c are connected to pulse generator 22d. Pulse generator 22d has its input connected to an OR gate 22e having two inputs. One input of OR gate 22e is connected to pulse generator 15 and the other input thereof is connected to a television signal detector 28. The detail of pulse generator 22d will be described later.

Television signal detector 28 has two inputs: one for receiving a horizontal pulse; and the other for receiving a sync-pulse. Accordingly, whenever a television signal, which may be obtained through the antenna (not shown), cable (not shown), or from a video tape, is being received, television signal detector 28 generates a HIGH output, such as shown in FIG. 3 at waveform E. Thus, television signal detector 28 produces LOW while the channel is being changed. From this viewpoint, the signal produced from television signal detector 28 is similar to the signal produced from pulse generator 15, except that the these two signals are in the opposite phase. Furthermore, the signal from television signal detector 28 has such a feature that, when a video tape is being reproduced, the channel change recorded in the tape can also be detached. Therefore, whenever there is a channel change in the reproduced video tape, no pulse will be produced from pulse generator 15, but a pulse will be produced from television signal detector 28.

Accordingly, OR gate 22e produces a signal not only when the channel is actually changed, but also when the channel change recorded in the video tape is detected.

As indicated in FIG. 3 waveform f, pulse generator 22d detects a step up of a waveform d or a step up of a waveform e, and produces a one-shot pulse having a pulse duration of t or t'. Accordingly, AND gates 22a, 22b and 22c are enabled only when the one-shot pulse is present, that is, a short period of time immediately after the channel change is effected which may be an actual channel change or a channel change recorded in the video tape.

AND gates 22a, 22b and 22c are connected to a hold circuit 23 which is coupled to a reset circuit 25. Reset circuit 25 receives the signal from television signal detector 28 and produces a reset signal when the channel is changed. Accordingly, when a new channel is selected, the output signal from AND gate 22a is held in hold circuit 23, and is produced from output terminal 24A of hold circuit 23. Similarly, the output signal from AND gate 22b is held and produced from output terminal 24B, and output signal from AND gate 22c is held and produced from output terminal 24C. Once the hold circuit holds various data from AND gates 22a, 22b and 22c immediately after the channel selection, the data is maintained as long as the selected channel is on.

Output terminal 24A, carrying data of subcarrier frequency, is connected to switching circuit 6 for selecting either one of crystal vibrators 5a and 5b, and also to band pass filter 19, video trap 32 and sound trap 30.

Output terminal 24B, carrying data representing the SECAM system, is connected to SECAM circuit 26 for maintaining the SECAM circuit operative while the received television signal is SECAM system.

Output terminal 24C, carrying data representing the PAL system or NTSC system, is connected to PAL/NTSC demodulator 33 for actuating demodulator 33. When the received television signal is PAL system, output terminal 24C will produce LOW, thereby setting demodulator 33 as a PAL demodulator. On the contrary, when the received television signal is NTSC system, output terminal 24C will produce HIGH, thereby setting demodulator 33 as a NTSC demodulator.

Next, the operation of the circuit of FIG. 2 is described. The television receiver according to the embodiment shown in FIG. 2 is operable to five different broadcasting systems, which are: PAL system with 3.58 MHz subcarrier wave; PAL system with 4.43 MHz subcarrier wave; NTSC system with 3.58 MHz subcarrier wave; NTSC system with 4.43 MHz subcarrier wave; and SECAM system with 4.43 MHz.

It is assumed that channel selector 14 is now being actuated to select a television signal of NTSC system with 3.58 MHz subcarrier wave. When channel selector 14 is actuated, pulse generator 15 produces a pulse (first pulse in waveform d) which affects pulse generator 22d to produce a one-shot pulse (first pulse in waveform f). While the one-shot pulse is present, flip-flop 8 produces HIGH indicating that the subcarrier wave has a frequency 3.58 MHz. Also, SECAM circuit 26 produces LOW indicating that the received television signal is not the SECAM system, and PAL/NTSC detector 27 produces HIGH indicating that the received television signal is NTSC system.

Accordingly, when the one-shot pulse (first pulse in waveform f) is produced from pulse generator 22d, each of AND gates 22a and 22c produces HIGH (waveforms g and i), and AND gate 22b produces no pulse (waveform h). The signals from AND gates 22a, 22b and 22c are produced in response to the one-shot pulse, and are held in holding circuit 23 which accordingly produces HIGH, LOW and HIGH, respectively, from its output terminals 24A, 24B and 24C. These signals produced from output terminals 24A, 24B, and 24C are maintained until reset circuit produces a reset signal, that is until the next channel change.

The HIGH from output terminal 24A is applied to switching circuit 6 for selecting crystal vibrator 5a for the oscillation at the frequency 3.58 MHz. The HIGH from output terminal 24A is also applied to band pass filter 19 for selecting a band appropriate for the 3.58 MHz subcarrier wave, and further to video trap 32 and to sound trap 30.

The LOW from output terminal 24B is applied to SECAM circuit 26 so as to disable the SECAM circuit 26.

The HIGH from output terminal 24C is applied to PAL/NTSC demodulator 33 so as to set demodulator 33 as a NTSC demodulator.

Since the data representing the system of the television signal and the data representing the frequency of the subcarrier wave are applied to hold circuit 23 only when AND gates 22a, 22b and 22c are enabled, that is a short period of time immediately after the change of the channel, the undesirable change or fluctuation in these data will not be transmitted to hold circuit 23 and to various circuits, such as to switching circuit 6. Accordingly, once hold circuit 23 holds data of the receiving television signal at the beginning of the channel selection, such data will not be changed even when the television signal fluctuates or when noise signal appears in the television signal. Accordingly, the television receiver not only automatically sets the circuit in a condition suitable for the system of the received television signal, but also maintains the set condition as long as the channel is maintained the same. When a channel change is effected by channel selector 14, or when the channel change signal as recorded in the video tape is reproduced, new data will be set and held in hold circuit 23.

Signals produced from output terminals 24A, 24B and 24C for the received television signals in different systems are shown in Table below.

| Received Television Signal | 24A | 24B | 24C |
|---|---|---|---|
| PAL 3.58 MHz subcarrier | LOW | LOW | LOW |
| PAL 4.43 MHz subcarrier | HIGH | LOW | LOW |
| NTSC 3.58 MHz subcarrier | LOW | LOW | HIGH |
| NTSC 4.43 MHz subcarrier | HIGH | LOW | HIGH |
| SECAM 4.43 MHz subcarrier | LOW | HIGH | LOW |

According to the embodiment shown in FIG. 2, detection control circuit 22 employs AND gates 22a, 22b and 22c, but these AND gates can be replaced with other logic gates, such as NOR gates, in the case where the pulses applied to the gates are in the negative form.

Figure 4:
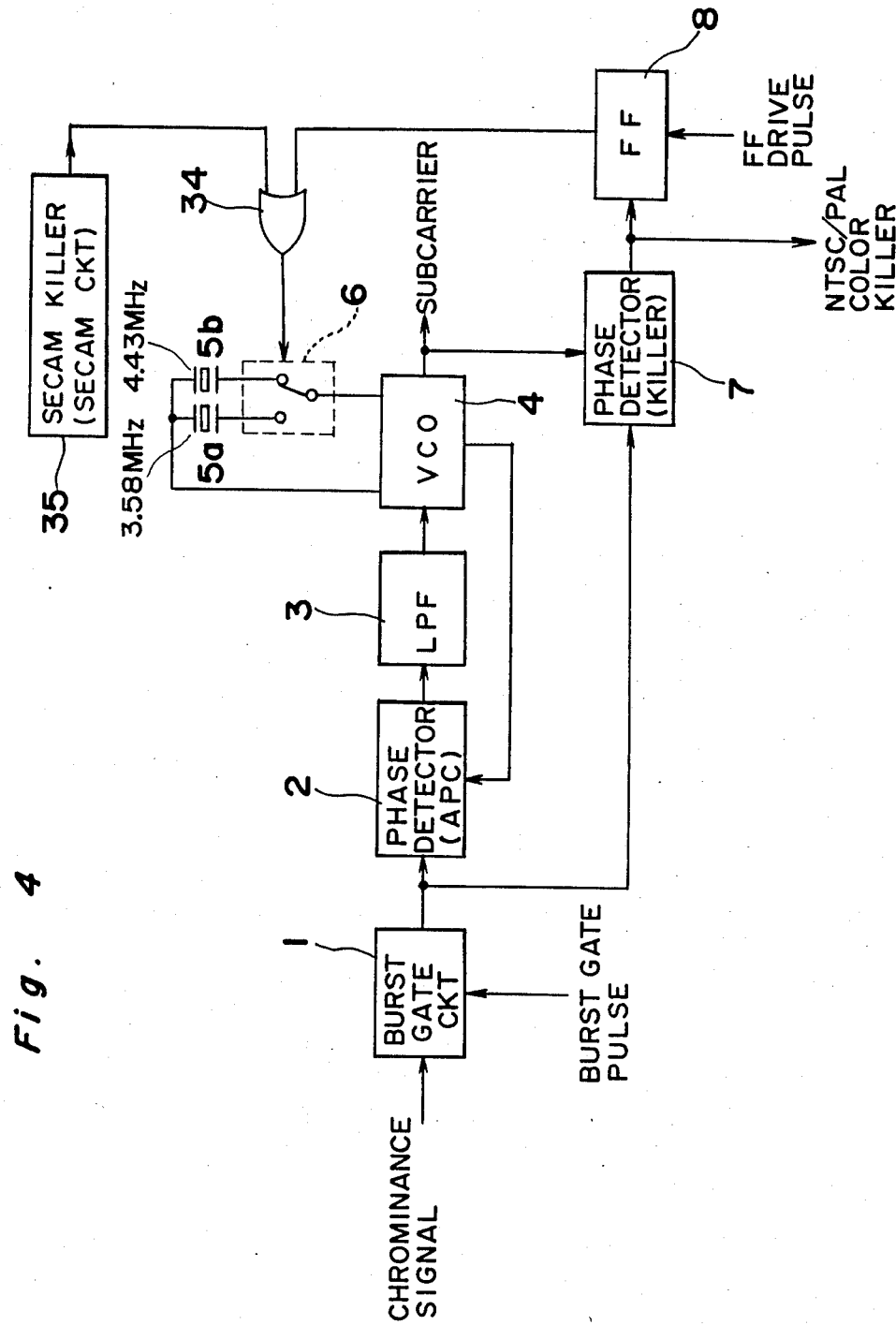
FIG. 4 is a block diagram showing a modification of a subcarrier generation circuit, according to the present invention.

Referring to FIG. 4, a modification of a subcarrier generation circuit, according to the present invention is shown. The output of flip-flop 8 is connected to an OR gate 34 which also receives a signal from a SECAM killer 35 in a SECAM circuit. The output of OR gate 34 is connected to switching circuit 6. The operation of this circuit is described below.

When a television signal of the NTSC system is being received, flip-flop 8 produces HIGH in a manner described above Then, the HIGH is applied through OR gate 34 to switching circuit 6 so as to oscillate at 3.58 MHz by crystal vibrator 5a. Accordingly, the APC loop synchronizes at the frequency 3.58 MHz and therefore, the VCO generates subcarrier wave at 3.58 MHz.

When a television signal of the PAL system is being received, flip-flop 8 produces LOW in a manner described above. Then, the low is applied through OR gate 34 to switching circuit 6 so as to oscillate at 4.43 MHz by crystal vibrator 5b. Accordingly, the APC loop synchronizes at the frequency 4.43 MHz and therefore, the VCO generates subcarrier wave at 4.43 MHz.

When a television signal of the SECAM system is being received, SECAM KILLER 35 for the SECAM color killer produces HIGH. Therefore, regardless of the signal from flip-flop 8, OR gate 34 produces HIGH. Accordingly, switching circuit 6 is so turned as to oscillate at 3.58 MHz. In this case, subcarrier wave component at the frequency 4.25 MHz or 4.406 MHz contained in the chrominance signal may be applied to phase detector 2. Since such frequencies are much different from 3.58 MHz, VCO 4 generates subcarrier wave at 3.58 MHz without making any retraction operation by the APC loop.

In this case, the color killer output produced from phase detector 7 may be use for disabling a color processing circuit for the NTSC/PAL system and for enabling a color processing circuit for the SECAM system.

Figure 5:
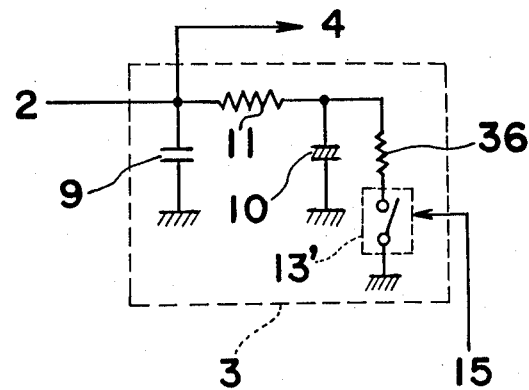
FIG. 5 is a circuit diagram of a low pass filter which may be replaced with the low pass filter shown in FIG. 2.

Referring to FIG. 5, a circuit diagram of a low pass filter is shown. According to low pass filter 3 shown in FIG. 2, a series connection of capacitor 12 and normally-closed switch 13 is connected parallel to capacitor 10 so as to shorten the time constant when switch 13 opens. According to the modification shown in FIG. 5, a series connection of a resistor 36 and a normally-open switch 13' is connected parallel to capacitor 10. Accordingly, when the channel change is effected, switch 13' closes to shorten the time constant. Accordingly, low pass filter 3 shown in FIG. 2 can be replaced with low pass filter 3 shown in FIG. 5.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A multi-system television receiver capable of receiving television signals of the PAL system, SECAM system and NTSC system, comprising:
    an APC loop including a voltage controlled oscillator and vibrating elements selectively coupled to said oscillator for producing an oscillation signal at different frequencies;
    a phase detector for detecting a phase difference between a burst signal of the received television signal and said oscillation signal from said oscillator and outputting a signal corresponding thereto;
    a flip-flop which is controlled by said signal produced from said phase detector;
    a killer circuit for generating a color killer signal for the SECAM system in response to a received television signal of the PAL or NTSC system; and
    a switching circuit controlled by said flip-flop and said killer circuit for selecting one vibrating element for effecting the oscillation of said voltage controlled oscillator at a required frequency.

2. A multi-system television receiver as claimed in claim 1, further comprising a pulse generating means for generating a channel change pulse upon change of a TV channel of said receiver, and wherein said APC loop further comprises a low pass filter connected to said voltage controlled oscillator, said low pass filter having a time constant setting circuit for making the time constant of said low pass filter relatively shorter when said channel change pulse is generated.

3. A multi-system television receiver as claimed in claim 1, further comprising a pulse generating means for generating a channel change pulse upon change of a TV channel, and wherein said phase detector has a time constant setting circuit for making the time constant of said phase detector relatively shorter when said channel change pulse is present.

4. A multi-system television receiver capable of receiving television signals of a plurality of different broadcasting systems with a plurality of different subcarrier wave frequencies comprising:
    frequency detecting means for detecting the frequency of a subcarrier wave of the received television signal and producing frequency data representing the detected frequency;
    system detecting means for detecting the system of the television signal and producing system data representing the detected system;
    channel change detecting means for detecting the changing of a TV channel of said receiver;
    holding means for holding said frequency data and system data upon said changing of the channel detected by said detecting means; and
    television receiver circuits set in a condition in compliance with the broadcast system of said received television signal as determined by said frequency data and said system data.

5. A multi-system television receiver as claimed in claim 4, wherein said frequency detecting means comprises a phase detector and an oscillator, said phase detector detecting a phase difference between a burst signal of the received television signal and a subcarrier signal produced from said oscillator, and producing an output signal corresponding thereto, and a flip-flop connected to said phase detector and responsive to said output signal for producing said frequency data.

* * * * *